Figure 1:
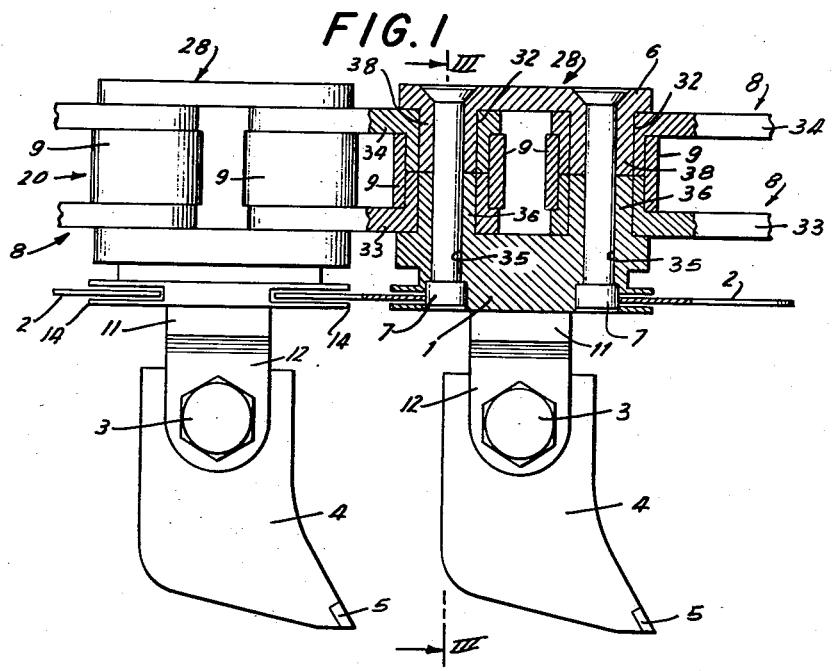

Oct. 22, 1957 H. FRITZSCHE 2,810,568
MINING CHAIN CUTTER
Filed Oct. 6, 1955

INVENTOR.
HEINZ FRITZSCHE
BY Henry K. Fart
ATTORNEY

United States Patent Office 2,810,568
Patented Oct. 22, 1957

2,810,568

MINING CHAIN CUTTER

Heinz Fritzsche, Trobitz, Kreis, Finsterwalde, Germany, assignor to VEB Braunkohlenwerk Domsdorf, Domsdorf, Germany Application October 6, 1955, Serial No. 538,876

5 Claims. (Cl. 262—33)

This invention relates to cutting devices for use in mining and more particularly to a milling or cutting chain for arrangement in a chain frame of a chain cutter which may be used for cutting out a section in a mine.

It is an object of the present invention to provide a chain cutter which is wear-resistant, especially with respect to the elements of its chain.

It is a further object of the invention to provide a chain cutter the construction of which avoids or reduces to a minimum the entering of foreign particles cut off by the cutting tools through openings of the chain frame into the interior of the cutter especially into spaces between the chain elements and between the chain elements and the bearing portions of the chain frame.

A still further object of the invention is to provide a chain cutter the construction of which reduces to a minimum the loss of lubricant during operation.

Yet another object of the invention is to provide a chain cutter wherein the drawing and shearing forces occurring during operation are taken up without affecting the life of the chain of the chain cutter.

It is also an object of the invention generally to improve on the art of chain cutters as now customarily made.

Figure 2:
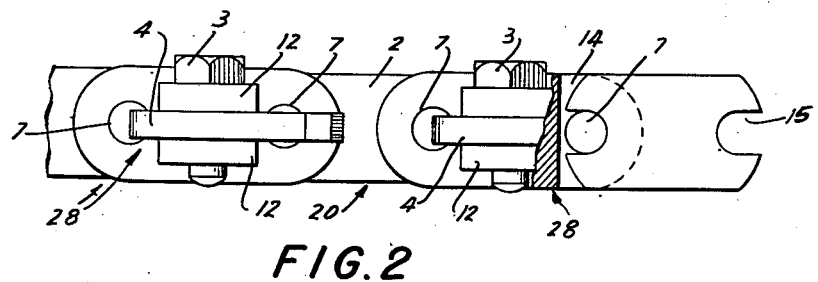
Figure 3:
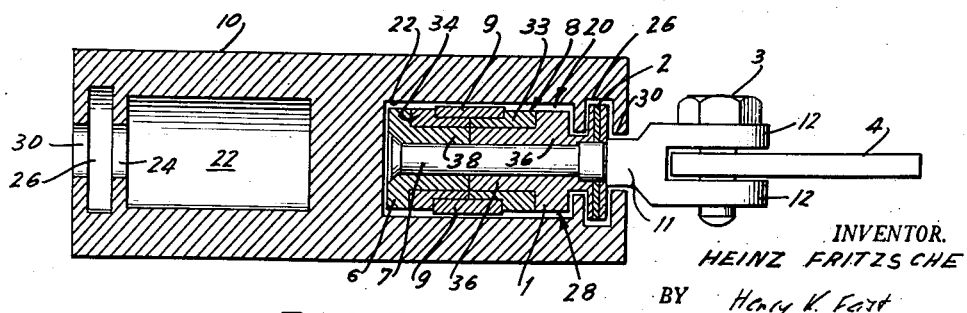

Other objects and structural details of the invention will be apparent from the following description when read in conjunction with the accompanying drawings forming part of this specification, wherein:

Fig. 1 is a fragmentary side elevational view of a chain of a chain cutter according to this invention, partly in section, Fig. 2 is a fragmentary bottom plan view of the chain shown in Fig. 1, partly in section, and Fig. 3 is a sectional view taken along line III—III of Fig. 1, the chain being shown as fitted within a chain frame.

Referring now to the drawings, 20 generally indicates a milling or cutting chain of a chain cutter for mining purposes, carrying a plurality of cutting tools or blades 4.

As bset shown in Fig. 3, the chain 20 driven by a motor (not shown) moves within suitably shaped grooves 22, 24, 26 of a chain frame 10.

The chain 20 has a plurality of relatively movable first links or carriers generally indicated by 28 which are connected with each other by a plurality of second links or connecting links generally indicated by 8. (See Figs. 1 and 3.) Each of the carriers 28 includes an outer portion 1 and an inner portion 6 being in abutting engagement with each other and being tightly connected with each other by a pair of rivets 7 passing through bores 35 of the registering shaft-like portions 36 and 38 of said outer and inner portions 1 and 6. Each outer portion 1 includes a bifurcated extension 11 rigid therewith. As best shown in Fig. 3, said bifurcated extension 11 passing through the aperture 30 of the chain frame 10 projects from the latter. A series of cutting tools or blades 4 of suitable shape is inserted into the spaces between the forks 12 of the bifurcated extension 11. Each blade 4 carries a plate 5 of very hard material, for example a material known in the trade under the trade-name "Widia," at its cutting area. The blades 4 are connected with the bifurcated extension 11 of the carriers 28 by means of screws 3.

Each connecting link 8 includes an outer portion 33 and an inner portion 34. Each end of each connecting link 8 is in the shape of a bushing 32 surrounding the shaft portions 36 and 38, respectively, of the outer and inner portions 1 and 6 of the adjacent carrier 28. Furthermore a roller 9 is rotatably mounted on each bushing-like portion 32 of the connecting links 8. Each of said rollers 9 protruding slightly from the outer surface of the bushing 32 may roll along the surface of the groove 22 of the chain frame 10.

Thus, on one hand, the chain 20 does not slide along a surface of the chain frame 10 but its rollers 9 roll along the inner surface of the groove 22 of the chain frame 10, whereby wear and tear is considerably reduced. Furthermore, on the other hand, owing to the arrangement of the rollers 9 and the bushing-like portions 32 of the connecting links 8 surrounding the shaft portions 36, 38 of the outer and inner portions 1 and 6 of the carriers 28, the rivets 7 passing through bores of said shaft portions are not subjected to shearing forces.

In order to protect the chain 20 moving within a chamber of the chain frame 10 from particles cut off by its blades 4 during the operation of the chain cutter and also to prevent the lubricant from leaving the chamber containing the chain 20 the following arrangement is made:

The outer portion 1 of each carrier 28 has two transverse slots 14 which extend near the blade-carrying face of said outer portions 1, one slot at each end. Protecting plates 2 are inserted into these slots 14 in such a manner that one end of a plate 2 is held in one slot of the outer portion 1 of one carrier 28 while the opposite end is held in the slot 14 at the opposite side of the adjacent carrier 28. Thus, each protection plate 2 extends between two adjacent carriers 28. Each protecting plate 2 has a cut-out portion 15 at each end by means of which it engages round the enlarged outer portion of a rivet 7 of the respective outer portion 1 of the carrier 28, whereby the protecting plate 2 is secured against lateral displacement relative to the carriers 28. As will be readily understood, the protecting plates 2 extend between adjacent carriers 28 in such a manner that the outer face of the chain forms a substantially straight and closed surface, whereby the entering of foreign particles cut off by the blades 4 into the interior of the chain 20 beyond the plates 2 on the one hand and the passing out of lubricant from the elements of the chain 20 on the other hand is prevented. As best shown in Fig. 3, the protecting plates 2 sealing the chain 20 proper move within the groove 26 of the chain frame 10.

I have described a preferred embodiment of my invention, but it is understood that this disclosure is for the purpose of illustration, and that various omissions and changes in shape, proportion and arrangement of parts, as well as the substitution of equivalent elements for the arrangements shown and described may be made without departing from the spirit and scope of the invention as set forth in the appended claims.

What I claim is:

1. A chain for a chain cutter, comprising: a plurality of spaced carriers, a plurality of links movably connecting said spaced carriers with each other, each carrier including an outer portion and an inner portion, a pair of first shaft-like means on each of said outer portions, a pair of second shaft-like means on each of said inner portions, said first and second shaft-like means of the outer and inner portions of a carrier being in register with each other, said registering shaft-like means having coaxial bores, connecting bolts passing through said bores for tightly urging said first and second shaft-like means of the outer and inner portions of the carriers towards each other, said links including bushing-like portions surrounding registering shaft-like means of adjacent carriers, cutting tools mounted on the outer portions of said carriers, each of the outer portions of said carriers having transverse slots at opposite ends, each of said connecting bolts passing through one of said transverse slots substantially at a right angle, and a plurality of protecting plates, each of said protecting plates having recesses at opposite ends, the ends of said protecting plates being inserted into the transverse slots of adjacent carriers, and said recesses of said protecting plates being engaged with said connecting bolts.

2. A chain for a chain cutter, comprising: a plurality of spaced carriers, a plurality of links movably connecting said spaced carriers with each other, cutting tools mounted on said carriers at the outer side thereof, a plurality of protecting means, each of said protecting means extending between and being engaged with adjacent carriers near the outer side thereof, each of said carriers having a recess, at each of its ends facing an adjacent carrier, and said protecting means including plates extending between adjacent carriers and engaged with said recesses.

3. A chain cutter, comprising: a chain frame, said chain frame having a chamber, said chamber communicating with the outside through an aperture, a chain including a plurality of carriers and a plurality of links movably connecting said carriers with each other, said chain being movably arranged in said chamber, said carriers partly extending outwardly through said aperture, cutting tools mounted on said outwardly extending portions of said carriers, rollers on said links for engagement with the inner surface of said chamber, each carrier including an outer portion and an inner portion, said outer portion of the carrier extending partly outwards through said aperture, a pair of first shaft-like means on each of said outer portions, a pair of second shaft-like means on each of said inner portions, said first and second shaft-like means of the outer and inner portions of a carrier being in register with each other, connecting means on said carriers for tightly urging said first and second shaft-like means towards each other, said links including bushing-like portions surrounding registering shaft-like means of adjacent carriers, and said rollers being rotatably mounted around said bushing-like portions.

4. In a chain cutter as claimed in claim 3, said registering shaft-like means having coaxial bores, and said connecting means being in the shape of bolts passing through said bores.

5. In a chain cutter as claimed in claim 4, each of the outer portions of said carriers having transverse slots at opposite ends, each of said connecting bolts passing through one of said transverse slots substantially at a right angle, and a plurality of protecting plates, each of said protecting plates having recesses at opposite ends, the ends of said protecting plates being inserted into the transverse slots of adjacent carriers, and said recesses of said protecting plates being engaged with said connecting bolts.

References Cited in the file of this patent

UNITED STATES PATENTS

| | | |
|---|---|---|
| 787,551 | Aultman | Apr. 18, 1905 |
| 1,336,927 | Silvius | Apr. 13, 1920 |
| 1,376,120 | Smith | Apr. 26, 1921 |
| 1,737,823 | Bodle | Dec. 3, 1929 |
| 2,276,731 | Lewis | Mar. 17, 1942 |
| 2,305,298 | Lewis | Dec. 15, 1942 |
| 2,685,361 | Garman et al. | Aug. 3, 1954 |

FOREIGN PATENTS

| | | |
|---|---|---|
| 213,434 | Great Britain | Apr. 3, 1924 |